(12) United States Patent
Balan et al.

(10) Patent No.: US 7,331,179 B2
(45) Date of Patent: Feb. 19, 2008

(54) SYSTEM AND METHOD FOR PRODUCTION OF HYDROGEN

(75) Inventors: Chellappa Balan, Niskayuna, NY (US); Michael John Bowman, Niskayuna, NY (US); Daniel Preston Smith, Ballston Spa, NY (US); Charles Max Byrd, Redwood City, CA (US)

(73) Assignee: General Electric Company, Niskayuna, NY (US)

( * ) Notice: Subject to any disclaimer, the term of this patent is extended or adjusted under 35 U.S.C. 154(b) by 409 days.

(21) Appl. No.: 10/955,406

(22) Filed: Sep. 30, 2004

(65) Prior Publication Data
US 2006/0065545 A1  Mar. 30, 2006

(51) Int. Cl.
*F03G 7/00* (2006.01)
(52) U.S. Cl. .................................... 60/641.2
(58) Field of Classification Search ............ 60/641.2, 60/641.3, 641.4
See application file for complete search history.

(56) References Cited

U.S. PATENT DOCUMENTS

| 4,120,158 A | * | 10/1978 | Sheinbaum | ............... 60/641.3 |
| 4,192,854 A | * | 3/1980 | Harvey et al. | ............. 423/220 |
| 4,282,187 A | * | 8/1981 | Corbett et al. | ............. 422/190 |
| 4,996,846 A | | 3/1991 | Bronicki | .................... 60/641.2 |
| 5,526,646 A | * | 6/1996 | Bronicki et al. | ........... 60/641.2 |
| 5,661,977 A | | 9/1997 | Schnell | ...................... 60/641.2 |
| 2003/0010652 A1 | | 1/2003 | Hunt | ......................... 205/742 |
| 2003/0196893 A1 | * | 10/2003 | McElroy et al. | ........... 204/266 |
| 2004/0180249 A1 | | 9/2004 | Pham et al. | .................. 429/33 |

* cited by examiner

*Primary Examiner*—Hoang Nguyen
(74) *Attorney, Agent, or Firm*—Fletcher Yoder

(57) ABSTRACT

A technique is disclosed for a system and method for combined production of power and hydrogen utilizing the heat from a first working fluid heated by a geothermal energy source using a steam generator and an electrolyzer designed to receive the steam produced by the steam generator for the production of hydrogen and oxygen using electrolysis.

32 Claims, 4 Drawing Sheets

SYSTEM AND METHOD FOR PRODUCTION OF HYDROGEN

BACKGROUND

The invention relates generally to a hydrogen gas generating system, and, more particularly, to a system for generating hydrogen by electrolysis of steam using heat from a geothermal energy source to produce the steam.

Geothermal energy is the natural heat of the earth. Geothermal energy has been used in power generation for many years. Typically, the heat from a geothermal energy source is used to heat a high pressure working fluid to a high temperature. The working fluid is then used to drive a turbine, either directly or indirectly through a heat exchanger, that is coupled to a generator to produce electricity.

Using heat from the geothermal energy to produce hydrogen is typically done by producing electricity as described above and then employing a low temperature liquid water-based electrolyzer using either alkaline or acid electrolytes or using proton exchange membrane (PEM) technology.

However, the above method of producing hydrogen using the thermal energy from the geothermal energy source is expensive and inefficient. There is a need, therefore, for a technique to improve the efficiency of power generation systems that utilize heat from a geothermal energy source to produce electricity and hydrogen.

BRIEF DESCRIPTION

In accordance with one aspect of the present technique, a system for producing hydrogen is provided. The system includes a first heat recovery steam generator operable to produce steam, using heat from a geothermal energy source and an electrolyzer in fluid communication with the first heat recovery steam generator. The electrolyzer receives the steam produced by the first heat recovery steam generator for the production of hydrogen and oxygen.

In accordance with another aspect of the present technique, a method for producing hydrogen is provided. The method includes extracting heat generated from a geothermal energy source to produce steam, directing the steam to an electrolyzer to produce hydrogen and oxygen and recycling heat within hydrogen and oxygen produced by electrolyzer.

In accordance with yet another aspect of the present technique, a system for a combined hydrogen and power generation system includes a hydrogen production system for the production of hydrogen and oxygen using the heat from the geothermal energy source, and a power generation system for the production of electricity using the heat from the geothermal energy source.

DRAWINGS

These and other features, aspects, and advantages of the present invention will become better understood when the following detailed description is read with reference to the accompanying drawings in which like characters represent like parts throughout the drawings, wherein.

Figure 3:
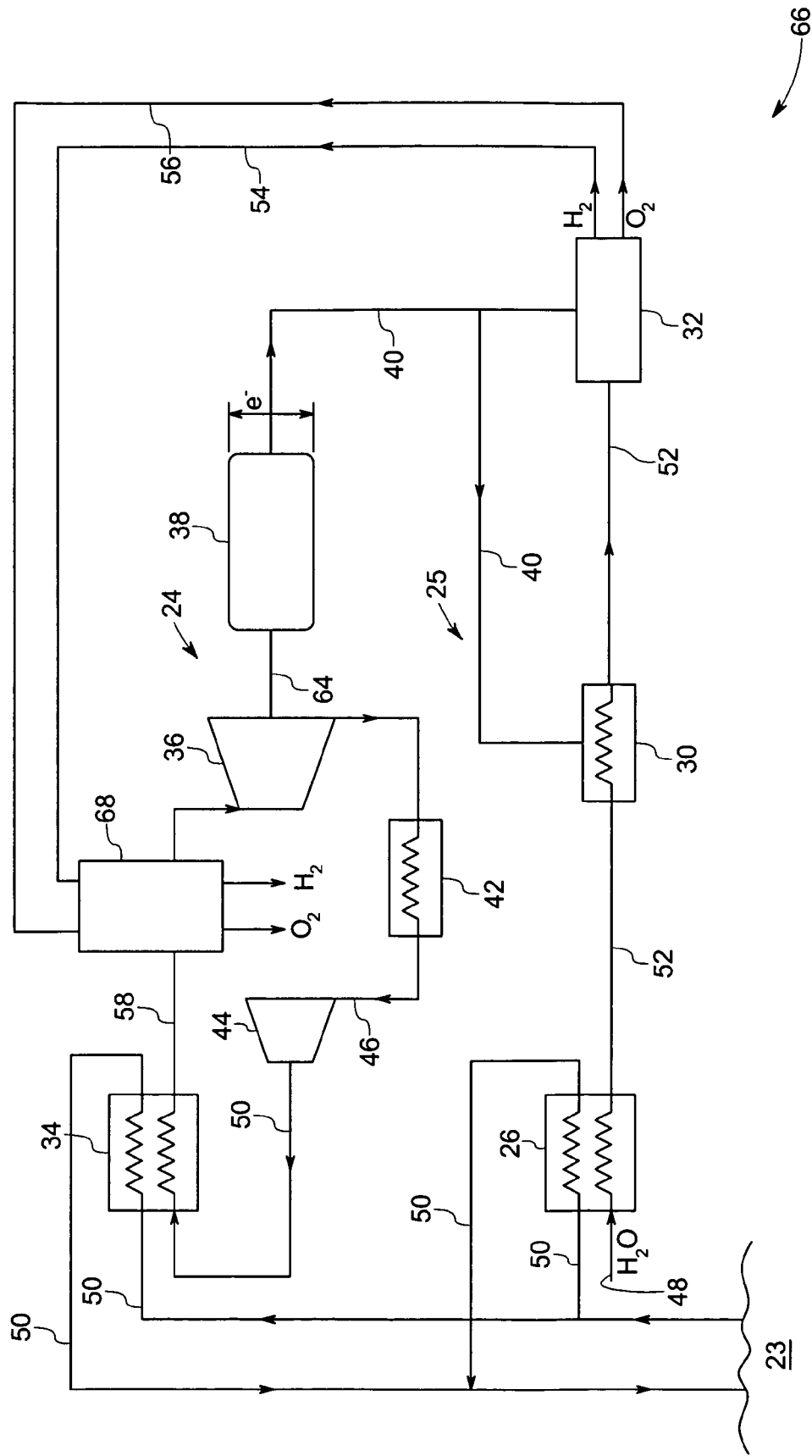
Figure 4:
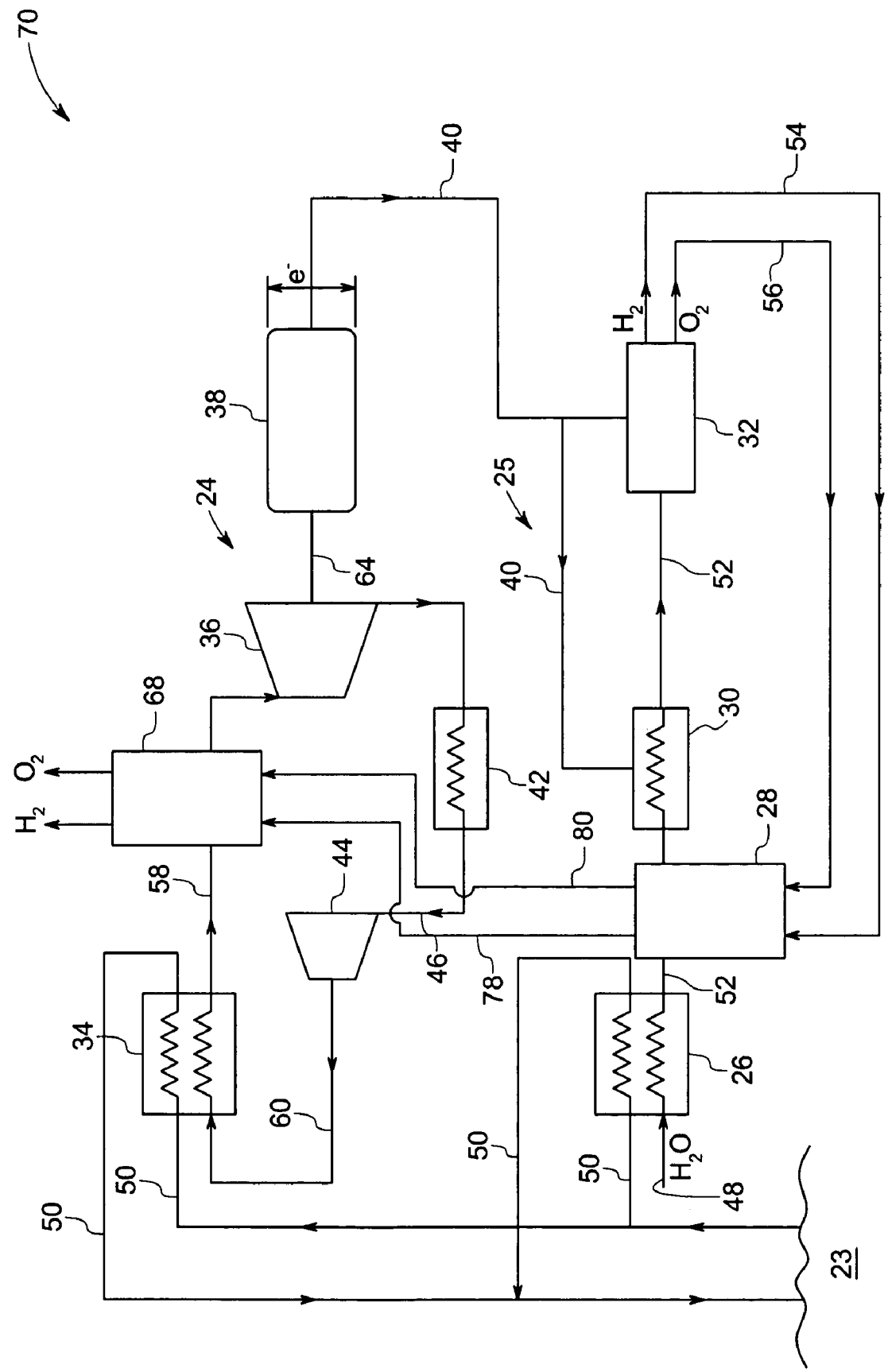

FIG. 3 is a schematic diagram of a system of producing hydrogen by electrolysis of steam produced by heat from a first working fluid heated by a geothermal energy source, in accordance with an alternative exemplary embodiment of the present technique; and FIG. 4 is a schematic diagram of a system of producing hydrogen by electrolysis of steam produced by heat from a first working fluid heated by a geothermal energy source, in accordance with a second alternative embodiment of the present technique.

DETAILED DESCRIPTION

Figure 1:
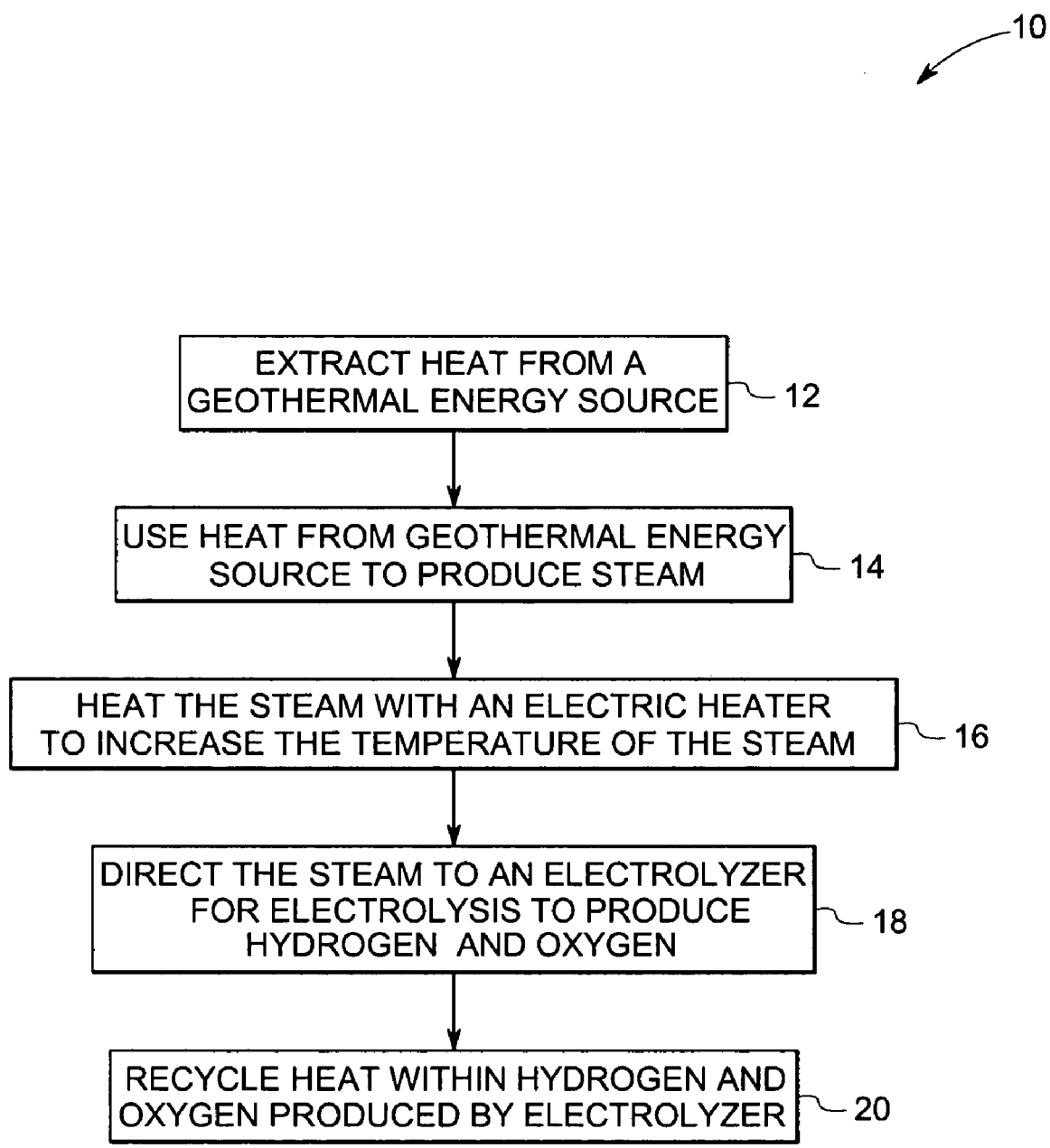
FIG. 1 is a block diagram of a method of producing hydrogen by electrolysis of steam produced by heat from a first working fluid heated by a geothermal energy source, in accordance with an exemplary embodiment of the present technique.

Turning now to the drawings, and referring first to FIG. 1, a block diagram of a process for producing hydrogen is provided, and represented generally by reference numeral 10. The process comprises extracting heat from a first working fluid heated by a geothermal energy source, represented by block 12. The method also comprises using the heat in the first working fluid to produce steam using a first heat recovery steam generator, as represented by block 14. In addition, the process may also comprise heating the steam with an optional electric heater to increase the temperature of the steam produced by the first heat recovery steam generator to an acceptable level required by the electrolyzer, as represented by block 16. The heated steam is, in turn, directed to an electrolyzer, where electrolysis is used to breakdown the steam into hydrogen and oxygen, as represented by block 18. The process also comprises recycling the heat in exhaust products of the electrolyzer, as represented by block 20. The recycled heat may be contained in the residual steam, the hydrogen, or the oxygen produced by the electrolyzer.

Figure 2:
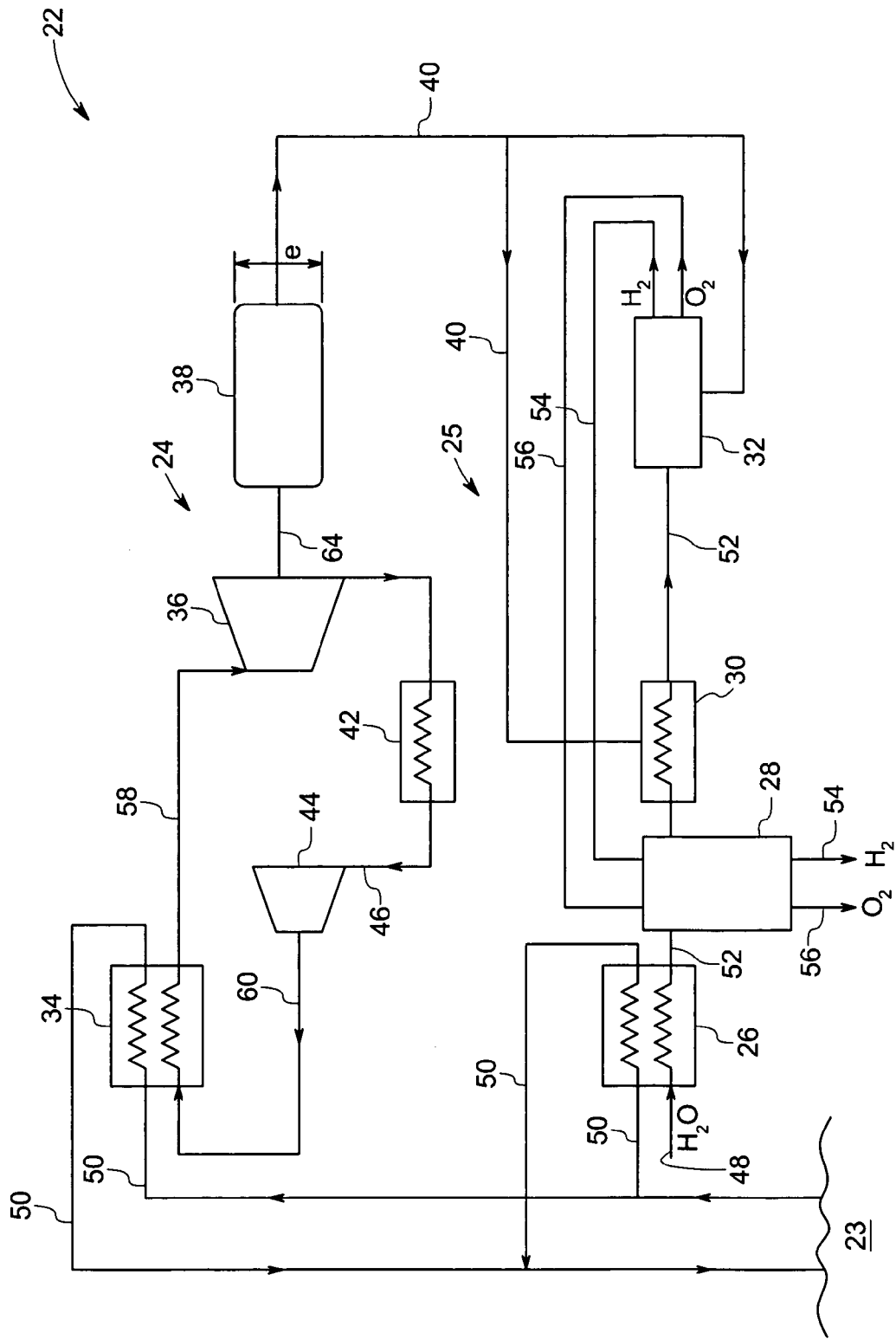
FIG. 2 is a schematic diagram of a system of producing hydrogen by electrolysis of steam produced by heat from a first working fluid heated by a geothermal energy source, in accordance with an exemplary embodiment of the present technique.

Referring generally to FIG. 2, a schematic diagram is provided of a combination power generation and hydrogen production system 22 that uses heat from a geothermal energy source 23 in the generation of power and the production of hydrogen. The combined power generation and hydrogen production system 22 comprises a power generation system 24 and a hydrogen production system 25. The hydrogen production system 25 comprises a first heat recovery steam generator 26 coupled to a first heat exchanger 28, an electric heater 30, and an electrolyzer 32. The power generation system 24 comprises a second heat recovery system 34 and a turbine 36 coupled to an electric generator 38 via a shaft 64 for producing electricity 40. In the illustrated embodiment, the power generation system 24 also comprises a condenser 42 and a pump 44.

In the illustrated embodiment, water 48 is pumped into the first heat recovery steam generator 26. In addition, a first working fluid 50 containing heat from the geothermal energy source 23 is directed into the first heat recovery steam generator 26. The heat is extracted from the geothermal energy source 23 by pumping the first working fluid 50 at high pressure through the geothermal energy source 23. The first heat recovery steam generator 26 receives the first working fluid 50 from the geothermal energy source 23 and transfers the heat in the first working fluid 50 to the water 48 in the first heat recovery steam generator 26. The heat from the first working fluid 50 causes the water 48 to boil to steam 52. From the first heat recovery steam generator 26, the first working fluid 50 flows back to the geothermal energy source 23 for reheating.

The steam 52 is converted by the electrolyzer 32 into hydrogen 54 and oxygen 56 using electrolysis. However, before it enters the electrolyzer 32, the steam 52 in the first heat recovery steam generator 26 flows to a first heat exchanger 28 that is adapted to transfer heat in the hydrogen 54 and the oxygen 56 to the steam 52. The steam 52 generated by the first heat recovery steam generator 26 may have a temperature in excess of 100 degrees Celsius. The first heat exchanger 28 is operable to heat the steam 52 to a temperature in excess of 100 degrees Celsius. From the first heat exchanger 28, steam 52 flows to the electric heater 30. The steam 52 is heated by the electric heater 30 to facilitate electrolysis in the electrolyzer 32. In the electrolyzer 32, the heated steam 52 undergoes the process of electrolysis, which breaks down the steam 52 into hydrogen 54 and oxygen 56. In this embodiment, the electricity 40 generated by the electric generator 38 is used by the electrolyzer 32 to perform the electrolysis.

Electrolysis is a process in which electric current is passed through water. The electric current results in the break down of the water into its component molecules: hydrogen and oxygen. In the process, heat is generated due to the current flow. As noted above, the heat in the hydrogen 54 and the oxygen 56 produced in the electrolyzer 32 is used in the first heat exchanger 28 to increase the temperature of the steam 52 produced by the first heat recovery steam generator 28. Advantageously, this aids in decreasing the consumption of electricity 40 used by the electric heater 30 for increasing the temperature of the steam 52.

As noted above, the first working fluid 50 from the geothermal energy source 23 is used by the power generation system 24 to produce electricity. The second heat recovery system 34 receives the first working fluid 50 from the geothermal energy source 23 and transfers the heat in the first working fluid 50 to a second working fluid 58. The second working fluid 58 is converted into a gas such as steam, by the second heat recovery system 34 for use by the turbine 36 to run the electric generator 38 to produce electricity 40. In the illustrated embodiment the second heat recovery system 34 is a second heat recovery steam generator. The second working fluid 58 is condensed from a gas back into a liquid 60 by the condenser 42. The liquid 60 is then pumped from the condenser 42 by the pump 44 to the second heat recovery steam generator 34. However, the second heat recovery system 34 may also be a heat exchanger. In addition, the second working fluid 58 may be ammonia or organic compounds suited for production of power. The power generation system 24 is conventionally known as "Rankine cycle" or "organic Rankine cycle" depending on the working fluid.

In an alternative embodiment, the first heat recovery steam generator 26 and the second heat recovery system 34 could be combined into a single heat recovery steam generator, if the first working fluid 50 and second working fluid 58 are the same, such as water. In addition, as will be discussed below, other modifications of the hydrogen production system 25 may be made to provide a system that effectively recycles the waste heat produced in the electrolyzer 32.

Referring generally to FIG. 3, a schematic diagram of an alternative embodiment of a combined power generation and hydrogen production system 66 that uses the heat from the geothermal energy source 23 to produce power and to produce steam for use in an electrolyzer 32 is provided. The illustrated embodiment is similar to the system 22 of FIG. 2. However, the system 66 also comprises a second heat exchanger 68 located between the second heat recovery system 34 and the turbine 36 to superheat the second working fluid 58 flowing from the second heat recovery system 34. The second heat exchanger 68 receives the hydrogen 54 and the oxygen 56 produced in the electrolyzer 32 and transfers their heat to the second working fluid 58 prior to the entry of the second working fluid 58 to the turbine 36.

Referring generally to FIG. 4, a schematic diagram of another embodiment of a power generation system 70 that uses the heat from the geothermal energy source 23 to produce power and to produce steam 52 for use in an electrolyzer 32 is provided. The illustrated embodiment comprises a first heat exchanger 28 located between the first heat recovery steam generator 26 and the electric heater 30 and a second heat exchanger 68 located between the second heat recovery system 34 and the turbine 36. Some of the heat within the hydrogen 54 and the oxygen 56 produced by the electrolyzer 32 is transferred to the first heat exchanger 28 to increase the temperature of the steam 52 generated from the first heat recovery steam generator 26 prior to the entry to the optional electric heater 30. The first heat exchanger 28 is coupled with the second heat exchanger 68. Some of the heat within the hydrogen 78 and the oxygen 80 is transferred to the second working fluid 58 in the second heat exchanger 68 to superheat the second working fluid 58 prior to entering the turbine 36.

The present technique enables a variety of benefits over the conventional system. The techniques described hereinabove provide a system and method for effectively utilizing the heat from a geothermal energy source 23 for the production of hydrogen and oxygen using the electrolyzer 36 and also for the production of electricity 40. The technique also provides an effective way of recycling the heat of hydrogen 54 and the heat of oxygen 56 produced by the electrolyzer 32 in the system 70 thereby reducing the sizes of various functional components of the system 70. In addition to this, the present technique also facilitates reduction in the consumption of electricity 40 by the electrolyzer 32 during electrolysis by effectively utilizing the heat from the first working fluid 50 heated by the geothermal energy source 23 to heat the water utilized for the production of hydrogen and oxygen by the electrolyzer.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for producing hydrogen, comprising:
   a first heat recovery steam generator operable to produce steam using heat from a first working fluid heated by a geothermal energy source, wherein the first heat recovery steam generator is adapted to transfer heat from the first working fluid heated by the geothermal energy source to water flowing in the first heat recovery steam generator; and
   an electrolyzer configured to receive the steam produced by the first heat recovery steam generator, wherein the electrolyzer produces hydrogen and oxygen from the steam produced by the first heat recovery steam generator.

2. The system as recited in claim 1, comprising a first heat exchanger operable to receive the steam from the first heat recovery steam generator and transfer heat from at least one of the hydrogen and the oxygen produced by the electrolyzer to the steam received from the first heat recovery steam generator.

3. The system as recited in claim 1, comprising an electric heater operable to heat the steam generated by the first heat recovery steam generator and heated by the first heat exchanger.

4. The system as recited in claim 1, comprising a second heat recovery system operable to transfer heat to a second working fluid using heat from the first working fluid heated by the geothermal energy source.

5. The system as recited in claim 4, comprising a turbine coupled to an electrical generator, wherein the turbine is driven by the second working fluid.

6. The system as recited in claim 1, comprising a second heat exchanger operable to transfer heat from at least one of the hydrogen and the oxygen produced by the electrolyzer to the second working fluid prior to entering the turbine.

7. The system as recited in claim 2, wherein the first heat exchanger is operable to transfer heat to the second heat exchanger.

8. A combined hydrogen and power generation system, comprising:
   a hydrogen production system, comprising:
      a first heat recovery steam generator operable to produce steam using heat from a first working fluid heated by the geothermal energy source, wherein the first heat recovery steam generator is adapted to transfer heat from the first working fluid heated by the geothermal energy source to water flowing in the first heat recovery steam generator; and
      an electrolyzer operable to convert the steam from the first heat recovery steam generator into hydrogen and oxygen; and
   a power generation system, comprising:
      a second heat recovery system operable to transfer heat from the first working fluid to a second working fluid;
      an electric generator; and
      a turbine coupled to the electric generator, wherein the turbine is driven by the second working fluid to power the electric generator to produce electricity.

9. The system as recited in claim 8, comprising a first heat exchanger operable to receive the steam from the first heat recovery steam generator and to transfer heat from at least one of the hydrogen and the oxygen produced by the electrolyzer to the steam received from the first heat recovery steam generator.

10. The system as recited in claim 8, comprising an electric heater operable to heat the steam generated by the first heat recovery steam generator and heated by the first heat exchanger.

11. The system as recited in claim 8, comprising a second heat exchanger operable to transfer heat from at least one of the hydrogen and the oxygen produced by the electrolyzer to the second working fluid generated by the second heat recovery system.

12. The system as recited in claim 8, wherein the turbine is driven by the second working fluid.

13. The system as recited in claim 10, wherein the electric heater is operable to utilize electricity produced by the electric generator.

14. A method of utilizing heat from a geothermal energy source to produce hydrogen, comprising;
   extracting heat generated from a geothermal energy source to produce steam in a first heat recovery steam generator, comprising transferring heat generated from a first working fluid heated by the geothermal energy source to water flowing through the first heat recovery steam generator;
   directing the steam to an electrolyzer to undergo electrolysis to produce hydrogen and oxygen; and
   recycling heat within hydrogen and oxygen produced by electrolyzer.

15. The method as recited in claim 14, comprising heating the steam produced by the first heat recovery steam generator with an electric heater to increase the temperature of the steam and heated by a first heat exchanger.

16. The method as recited in claim 14, wherein the electrolyzer receives steam from the first heat recovery steam generator to produce hydrogen and oxygen from the steam.

17. The method as recited in claim 14, comprising transferring the heat from at least one of hydrogen and oxygen produced by the electrolyzer to the steam received from the first heat recovery steam generator via a first heat exchanger.

18. The method as recited in claim 14, comprising transferring heat from at least one of the hydrogen and the oxygen produced by the electrolyzer to a second working fluid generated by a second heat recovery system via a second heat exchanger.

19. A method of utilizing heat from a geothermal energy source for a combined hydrogen and power generation system, comprising:
   extracting a first part of heat from a geothermal energy source to produce steam in a first heat recovery steam generator, comprising transferring heat generated from the first working fluid heated by the geothermal energy source to water flowing through the first heat recovery steam generator;
   directing the steam to an electrolyzer for electrolysis to produce hydrogen and oxygen;
   extracting a second part of heat from the geothermal energy source and transferring the heat to a second working fluid in a second heat recovery system;
   applying the second working fluid to a turbine coupled to an electric generator for producing electricity; and
   recycling the heat within hydrogen and oxygen produced by the electrolyzer in a first heat exchanger and a second heat exchanger.

20. The method as recited in claim 19, comprising an electric heater operable to heat the steam generated by the first heat recovery steam generator and heated by a first heat exchanger.

21. The system as recited in claim 19, wherein the first heat exchanger is operable to receive the steam from the first heat recovery steam generator and to transfer heat from at least one of the hydrogen and the oxygen produced by the electrolyzer to the steam received from the first heat recovery steam generator.

22. The method as recited in claim 19, wherein the second heat exchanger operable to transfer heat from the hydrogen and oxygen produced by the electrolyzer to the second working fluid prior to the second working fluid entering the turbine.

23. The method as recited in claim 19, comprising applying the second working fluid generated by the second heat recovery system to the second heat exchanger.

24. The method as recited in claim 19, comprising utilizing the electricity produced by the electric generator to the electric heater for increasing temperature of steam coming out of the first heat recovery steam generator.

25. The method as recited in claim 19, wherein the first heat exchanger is operable to transfer heat to the second heat exchanger.

26. The method as recited in claim 20, wherein the electric heater is operable to utilize electricity produced by the electric generator.

27. The method as recited in claim 19, comprising utilizing the electricity produced by the electric generator for the production of hydrogen and oxygen by the electrolyzer.

28. The method as recited in claim 19, wherein the electric generator is coupled to the turbine and is adapted to utilize heat from the first working fluid heated by the geothermal energy source to produce electricity.

29. A hydrogen production system, comprising:
   an electrolyzer operable to convert steam into hydrogen and oxygen; and
   a heat exchanger operable to transfer heat from at least one of the hydrogen or the oxygen or a combination of both the hydrogen and the oxygen without combustion.

30. The hydrogen production system as recited in claim 29, wherein the heat exchanger is operable to transfer heat from the at least one of the hydrogen or the oxygen or a combination of both the hydrogen and the oxygen to the steam prior to entering the electrolyzer.

31. The hydrogen production system as recited in claim 29, comprising a heat recovery steam generator operable to produce the steam, wherein the heat recovery steam generator is operable to boil water to produce the steam by transferring heat from a first working fluid heated by a geothermal energy source to the water.

32. The hydrogen production system as recited in claim 29, comprising an electric heater operable to heat the steam prior to entering the electrolyzer.

* * * * *